United States Patent [19]

Morrell et al.

[11] 4,292,474

[45] Sep. 29, 1981

[54] ELECTRONIC KEY TELEPHONE SYSTEM WITH BI-DIRECTIONAL SERIAL DATA STREAM STATION CONTROL

[75] Inventors: Wilfred L. Morrell, Boca Raton; William M. Levine, Lauderdale Lake, both of Fla.

[73] Assignee: OKI Electronics of America, Inc., Ft. Lauderdale, Fla.

[21] Appl. No.: 66,474

[22] Filed: Aug. 13, 1979

[51] Int. Cl.$^3$ .............................................. H04Q 5/18
[52] U.S. Cl. .............................................. 179/99 M
[58] Field of Search .................... 179/99; 370/100, 110

[56] References Cited

U.S. PATENT DOCUMENTS

| | | | |
|---|---|---|---|
| 3,843,845 | 10/1974 | Ridley | 179/99 M |
| 3,973,085 | 8/1976 | Shiff | 179/99 M |
| 4,046,972 | 9/1977 | Huizinga et al. | 179/99 M |
| 4,061,887 | 12/1977 | Kasson et al. | 179/99 M |
| 4,088,844 | 5/1978 | Kinnaird, Jr. | 179/99 M |
| 4,125,749 | 11/1978 | Kinoshita et al. | 179/99 R |
| 4,160,131 | 7/1979 | Kaul et al. | 179/99 M |

*Primary Examiner*—Gerald L. Brigance

[57] ABSTRACT

An electronic key telephone system which features a bi-directional serial data stream for transmission of control signalling between common control and station circuitry over a single power/data conductor pair independent of the speech conductor pair. The common control central processor includes clock and timing logic circuitry for defining a serial multiphase bit stream of clock and data pulses, each clock pulse initiating a new bit position. Frame intervals are defined by one or more bit positions devoid of both a clock pulse and data information. Common and proprietary data information in the form of unipolar binary signals is multiplexed onto the serial bit stream either at the central processor, at a station circuit, or at the station, and interlaced with clock pulses at predetermined word and bit positions within each frame for communication among the various system circuit elements. Use of the serial data stream transmission scheme simplifies the station electronics such that conventional single line telephone instruments may be configured for use in an electronic key telephone system.

14 Claims, 7 Drawing Figures

ELECTRONIC KEY TELEPHONE SYSTEM WITH BI-DIRECTIONAL SERIAL DATA STREAM STATION CONTROL

BACKGROUND OF THE INVENTION

1. Field of the Invention

This invention relates to the field of programmable microprocessor controlled electronic key telephone systems which feature digital data communication for control signalling between common control central processor elements and station instruments, and which thereby achieve a reduction in the associated station cable pairs required and increase the system feature capability.

2. Description of the Prior Art

Key telephone systems make it possible for a number of station positions to share the use of several incoming C.O. or PBX telephone lines. Similarly, key systems provide for the termination or appearance of more than one telephone line at the station location, thereby providing the station user with multiple line access to the outside. Intercommunication among stations of the key telephone system is provided by separate intercom paths and an auxiliary intercom switching matrix. Outside communications over these intercom paths generally is not possible. Buttons or keys at each telephone station provide manual selection and access to the associated telephone lines, and are used for control of the intercom paths, hold functions, paging, or other special service features furnished by the system. Normally, any incoming call over an outside C.O. line can be answered at any one of the telephone stations having an appearance of that particular line.

In contrast to the more sophisticated controls of private branch exchange systems, control of conventional key telephone systems is distributed throughout the system, and is usually manually initiated through the actuation of the corresponding line, intercom, or feature service button or keys.

Over the past three decades, key telephone systems employing conventional electro-mechanical technology have achieved widespread use, with nearly 13 million key station telephones currently in-place throughout the United States.

Over the years, the combination of the rudimentary form of distributed control ordinarily employed by conventional electro-mechanical key telephone systems, coupled with the desire to increase the number of outside lines, intercom paths, and special features appearing at each telephone station position, has resulted in enormous cabling requirements between the Key Service Unit (KSU) and the associated multi-line telephone instruments. This, in turn, has not only increased the material cost of conventional electro-mechanical key telephone systems, but it has also contributed to higher installation and maintenance labor costs required to sort out, connect, repair and otherwise maintain the complex array of premises wiring which is ordinarily associated with such systems.

With the advent of competition in the telecommunications terminal equipment industry over the last decade, new generations of electronic key telephone systems have been introduced. Generally, the new electronic systems have focused on efforts to reduce escalating cabling costs, and increase feature service capability. Unfortunately, efforts to achieve these objectives have not always been without offsetting costs of other types. For example, reduction in station cabling has been achieved only by combining greater use of centralized control coupled to sophisticated electronic stations by means of a data link. Many design solutions to the cable reduction problem have introduced time division multiplex switching (TDM) techniques at the common equipment for switching the station talk paths to the appropriate outside line or intercom path. While multiplexing the station speech paths to the telephone lines may help achieve a desired reduction in station pairs, it introduces an interruption in the direct metallic connection between the station and the outside line, and requires fairly high-powered central processor control and system programming. In addition, whether time division multiplex switching or space division switching is employed, electronic key system central processors usually require comparably sophisticated electronic multi-button station instruments in place of those of conventional design.

Not all electronic key systems have achieved cable reduction with the same degree of efficiency. While virtually all elctronic key systems have succeeded in reducing the cabling requirements below that formerly required with the electro-mechanical technology, not all electronic systems have achieved the same level of reduction. Many systems require a separate cable pair to furnish power to the additional station electronics. Other systems require a separate data pair for the transmission of data to the station and another data pair for the transmission of information from the station. Yet other electronic key systems require a dedicated cable pair terminated on station key buttons reserved for implementing special feature services.

The trend toward the use of data signalling between the common equipment central processor and the electronic station instruments has introduced environmental considerations which may affect the operation of these electronic key systems, or which may even restrict their use in many user applications. The transmission of high-speed data over the data links is vulnerable to the introduction of noise and other sources of possible data error, and requires introduction of highly sophisticated error detection and encoding schemes into the key system design previously familiar only to personnel in the data processing and computer fields. The installation, maintenance, repair and field assembly of these systems poses strange and unfamiliar problems to field personnel accustomed to conventional telephone technology.

It is therefore desirable in the design of electronic key systems to achieve the necessary cost-saving reductions in excessive cable material and labor costs, preserve a system identity with conventional telephone terminal equipment electro-mechanical technology, and yet offer the maximum feature flexibility and other economies afforded by the state-of-the-art integrated circuit and microprocessor electronic technologies.

Accordingly, it is one object of this invention to reduce the total number of station cable pairs ordinarily required between the key system KSU or common equipment, and the station position. More specifically, it is a further object of this invention to minimize the number of pairs required to no more than two pairs—one pair for both data and station power, and one pair for speech signals.

Another object of this invention is to improve the efficiency and reliability, and reduce the cost of data signal transmission between the KSU central processor and the station positions by means of bi-directional serial bit stream control over a digital data communication link.

Another object is to reduce the number of key system circuits and components required to provide special key system service features, by initiating such features using non-locking station-associated buttons as multi-function switches, and programming the central processor to respond to sequential operation of said switches.

Still another object of this invention is to reduce total key system costs by avoiding the need for expensive multi-button electronic telephone instruments ordinarily required for use with electronic key systems.

SUMMARY OF THE INVENTION

Many of the problems encountered in providing a full-featured electronic key telephone system using state-of-the-art microprocessor and LSI circuitry, common central processor control, data links between common control and the station position, and sophisticated station electronics are overcome by this invention using a combination of functional component modularity and a novel scheme for data transmission between the station electronics and the central processor. Further, reduction in cable pairs is achieved by redistributing the station speech path to C.O./PBX connection function from its conventional position on the line circuit, to a station circuit module. The mutiple station paths to the C.O./PBX line and intercom links formerly required in fully electro-mechanical systems are reduced by this invention by a speech bus interconnecting the various line and intercom circuits to each station circuit module as the KSU common equipment. The use of the serial bit stream technique of this invention requires a maximum of one data conductor pair for both the bi-directional transmission of data signals and for the distribution of power to the station module electronics.

A conventional single line telephone set is connected through a single speech pair to the station circuit module. The station module, which is co-located with the telephone set, contains the station electronics and the push-button key switches used to signal access to multiple C.O./PBX lines. Line pick-up, hold and other station-initiated feature signals are transmitted by the station module to, and audible and visual indicator control information signals received from, an intermediate station circuit module in communication with the key system central processor. Control data communication to and from the station module is over a single data link independent of the talk path. A remote source of D.C. power is phantomly coupled for transfer to the electronic station adapter over the data link. Data signals indicative of line pick-up identity are transmitted over the station data link and processed by the central processor to operate the associated local line switching mechanism to effectuate a connection of the station talk path to the related C.O./PBX line or intercom path. Once this connection is made, a direct metallic path is established between the station set and the desired line.

Hook-switch status, network or call signaling, either by dial pulses or DTMF tones, and speech signals are transmitted to and from the telephone set to the C.O./PBX lines or intercom path, where applicable, over a single talk path separate from the data link. Station on-hook and off-hook status is conveyed over the talk path directly from the conventional telephone instrument, and is observed by a conventional on-hook detector located on the station control circuit. Similarly, incoming call signals destined for lines associated with each station are detected by ring detectors of conventional technology, the output of which is processed by the central processor. The central processor initiates the appropriate talk path connection at the corresponding station circuit module, while audible ringing and lamp indicator signals are transmitted to the station module via the station circuit over the data link.

Many basic key system functions are accomplished using conventional components familiar throughout the industry. Moreover, assembly, repair, and system expansion is facilitated by the optimal grouping of these components onto one or other of four basic system modules. Most of the sophisticated electronics, including microprocessor, memory, timing and clock circuits, and communication controls, are located on the principal component—the central processor printed circuit board.

Conventional line circuit components and intercom components have been grouped on a combination line-/intercom circuit module. This module includes conventional ring detector, off-hook detector, hold relay, other special feature components such as privacy, paging, or music-on-hold, intercom talk battery, and tone generator components.

The third major system component is a station control circuit module. As in the line/intercom circuit module, the station control circuit includes conventional supervisory relay, talk battery, off-hook detector, and busy tone generator components. In addition, it includes a data transceiver for interfacing with the combined data/power conductor pair, and control logic circuitry for communicating with the central processor.

The fourth major component is the station module. It is co-located with and adapts a conventional telephone instrument to operate in conjunction with the key system electronics under data stream control.

Intra- and inter-module data communication to and from the central processor is by means of parallel I/O data, address, and data control buses. The circulation of information on the parallel data buses is controlled by well-known time division multiplex techniques.

Clock pulses from the system clock at the central processor are multiplexed under the control of the central processor with common station data signals. The transfer of clock pulses and common data between the central processor and station circuit, as well as to the associated station modules over the data link is by means of a serial multi-phase bit stream. The serial bit stream is characterized by interlaced uniform clock and data pulses in each bit position. The clock pulse signifies a binary "1" or "0". The addressable bit positions are formated into 8-bit byte words, which are further formated into 32-bit frames. Each new frame is separated by at least one bit position devoid of either a clock or data pulse.

Common station data, proprietary station data, and station-initiated key switch data are transmitted in each frame. The information content of each bit position is re-circulated between station circuit module and station module unaltered until a corresponding signal change appears at either the central processor, the station circuit module, or the station module. The clock pulses are separated from the data pulses at the station module data receivers, and re-circulated in the bit stream to the station circuit module. Missing clock pulse detector means in the data receiver signals the start of each new frame for synchronization purposes.

Accordingly, it is one feature of this invention that power to operate the station electronics is delivered from a single remote power source over the bidirectional data conductor pair.

As another feature of this invention, the serial multi-phase bit stream requires only one system clock for data control to and from the station module.

As another feature of this invention, the relatively uniform clock and data pulses in the serial multi-phase bit stream reduce the size, and thus the cost, of the pulse transformer or other data power coupling means employed at each end of the data conductor pair.

Another feature of the invention allows for the continued use of conventional electro-mechanical key system technology for those basic functional components most familiar to installation and maintenance personnel, while concentrating the electronic technology in relatively few new components, thereby optimizing the advantages offered by factory assembly, production and programming techniques, while minimizing the amount of retraining required of field personnel.

Yet a further feature of this invention provides for the utilization of low-cost and readily available conventional-type telephone sets, while incorporating the advantages offered by largescale integrated circuitry for control data signal handling and for audible and visual indicator control, using an inexpensive separate electronic station module.

BRIEF DESCRIPTION OF THE DRAWINGS

The aforementioned objects and novel features of the invention, as well as other objects and features not specifically referenced, will be better understood in the context of the following detailed description and the appended claims, when considered in conjunction with the attached drawings of an illustrative embodiment, in which:

FIG. 4a–4n illustrate the generation of the serial bit stream, and show the characteristics of its various stages.

DETAILED DESCRIPTION

Overview of System Operation

Figure 1:
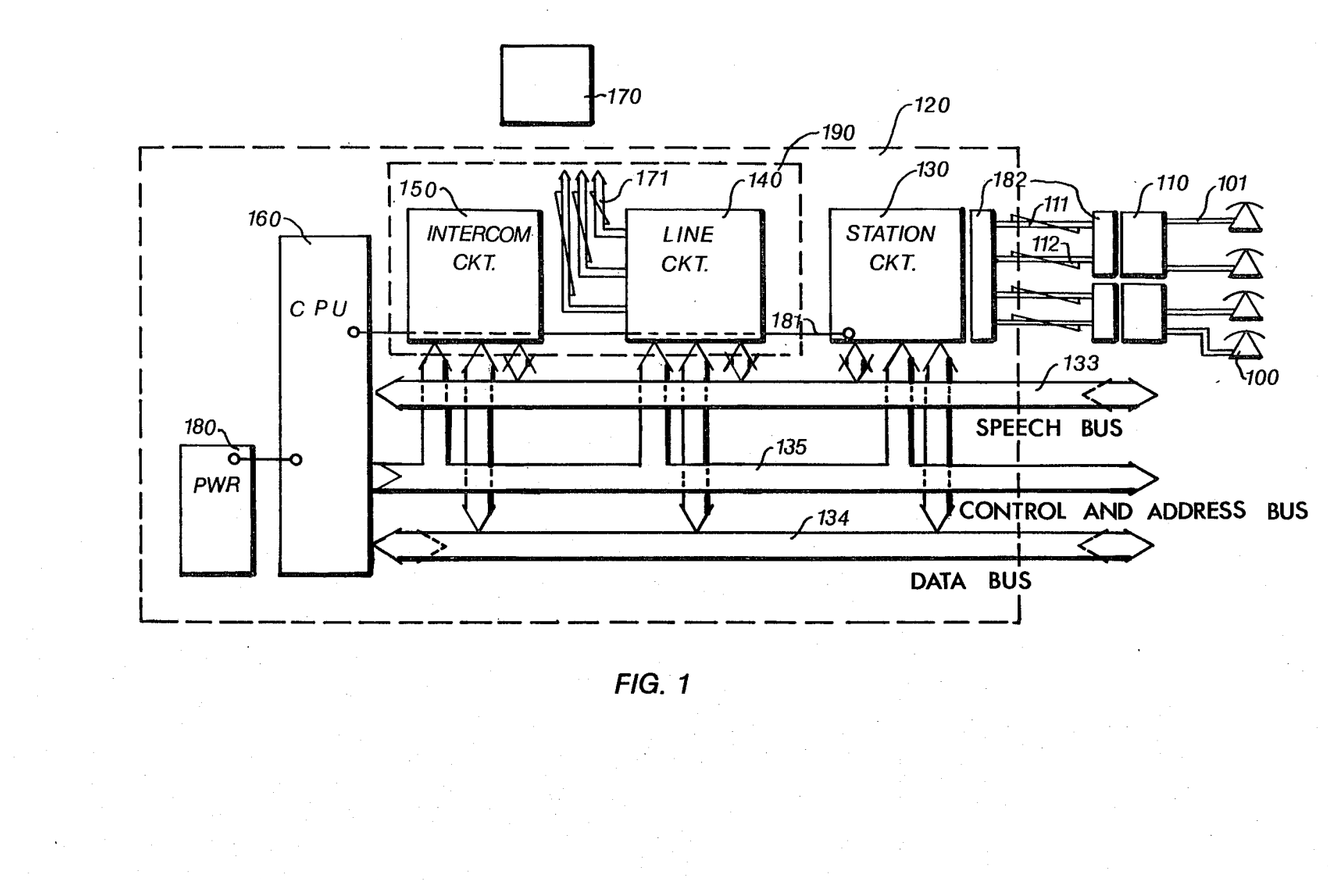
FIG. 1 is a simplified functional block diagram showing the preferred system layout of the invention.

The functional block diagram of the system layout, FIG. 1, illustrates the interconnections among the major components comprising this invention. A number of conventional single line telephone instruments, designated 100, are connected by means of a shortened cord 101 to their corresponding station module 110. Speech path conductor 111 is connected to C.O./PBX 170 via station link 171 through station circuit 130, station circuit link and speech bus 133, and line circuit 140. The station module speech path 111 is connected also via station control circuit 130 and station control circuit link and speech bus 133 to dial intercom module 150, which may also function as a special service module, such as for station-to-station paging.

Each station module 110 is also linked to station circuit 130 by the combined data/power conductor pair designated 112. Common station data control signals are communicated between central processor 160 and station circuit 130 over station circuit control and address bus 135. Proprietary station data control signals are communicated between line circuit and intercom modules 140 and 150, and station circuit 130 over parallel data bus 134, via central processor 160. Central processing unit 160 communicates control and address information with the line/intercom circuits 140 and 150, and station circuit module 130 over the parallel control and address bus 135, and data information over data bus 134. Power supply 180 supplies power for all system electronics over supply line 181 and over data/power conductor 112. Power is phantomly coupled over data/power conductor 112 by pulse transformers included in the data receiver 182 of station circuits 130 and station module 110.

Station circuit 130, line circuit 140, intercom circuit 150, central processor 160, and special key system feature modules are housed in common equipment 120. In accordance with one feature of this invention, the number of line and intercom circuits grouped on a single circuit module, as well as the number of station modules served by station circuits is variable, and can be selected by the designer to meet optimum requirements for modularity. In the preferred embodiment of this invention there are three line circuits and one intercom per circuit module 140, and two stations served per station circuit 130.

Description of Station Position

Figure 2:
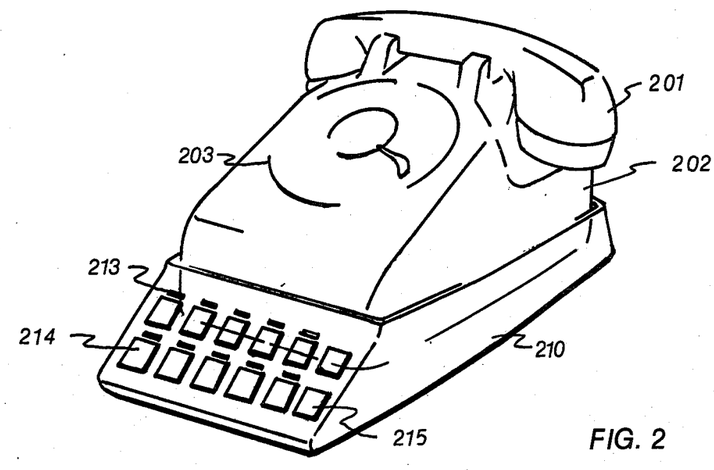
FIG. 2 illustrates the general physical design of the station module employed with its associated telephone instrument.

FIG. 2 illustrates the station position contemplated by the preferred embodiment of this invention, comprising a conventional telephone set including hand-set 201, housing 202 and standard dial or tone pad 203. The station's telephone network is connected by cord 101 to the molded base of station module 210 by a bridgeable connection (not shown) to an audible speaker and amplifier assembly. Station module 210 houses the electronnic circuitry which adapts the conventional telephone set for use as part of the electronic key system of this invention. The station module is designed to display on the front face plate lamp (LED) line and function indicators 214, associated with non-locking key switches 213. In the illustrated embodiment of this invention, each station module is designed to accommodate twelve such non-locking switches. The non-locking switches are of conventional design and operation, and are connected to generate a binary digital output signal when depressed. Key switches 213 are used to initiate access to a corresponding line or intercom circuit, and to initiate hold functions. They also serve as multi-function switches which, when depressed in the predetermined sequence programmed into the central processor memory, serve to initiate special service features, such as intercom dialing, conferencing, or paging access.

The specific functions of each of these major system components can be more effectively understood with reference to the separate detailed functional block diagrams.

Functional Description of Central Processor Unit

Figure 3A:
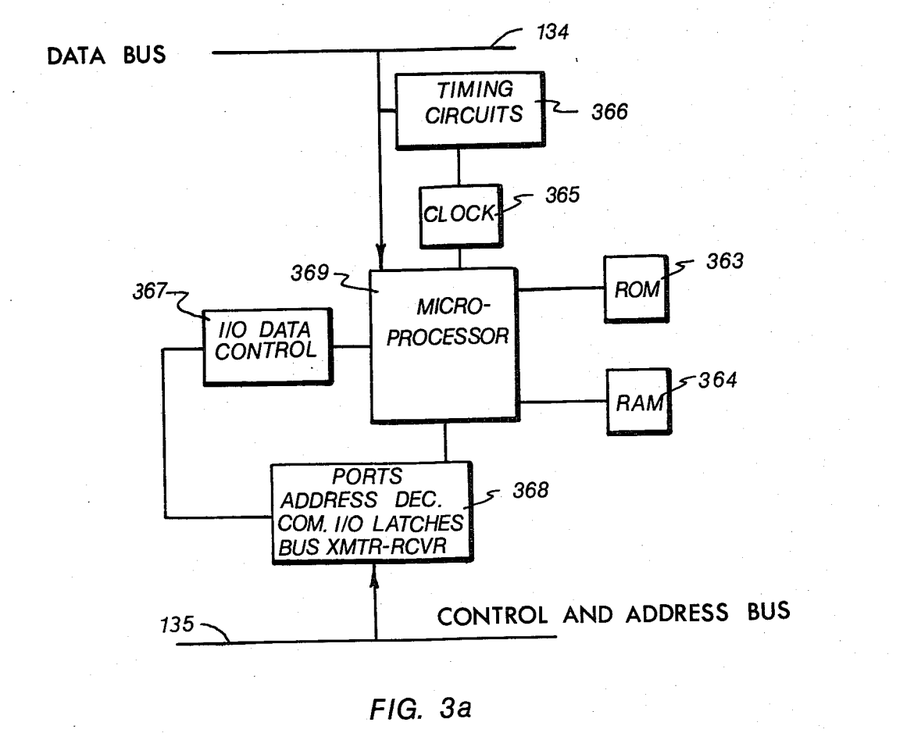
FIG. 3a is a functional block diagram of the central processor unit.

The central processor unit 160, shown in FIG. 1, is also represented by the block diagram of FIG. 3a. It includes a microprocessor 369, stored program memory 363, temporary storage memory 364, a single system clock 365, and timing and data handling circuitry 366, 367, and 368 to drive buses 134 and 135. Clock 365 steps microprocessor 362 through its program. The clock is a 4-phase circuit on an LSI chip with external crystal control. The primary frequency is 8 MHZ. The third phase, at frequency 2 MHZ, is used in timing circuit 366 to develop a five-phase, 20 kHz clock to control the serial bit stream between the processor module, station circuit module, and station module.

Central processor unit includes both ROM and RAM memories used by microprocessor 369. The ROMs (Read Only Memories) 363 constitute the principal source of system "software" program information. The ROMs are preprogrammed at the factory, and are not intended to be re-programmed in the field except by replacing the ROM chip. RAMs (Random Access Memories) 364 are used for temporary memory storage. One of the functions performed by RAMs 364 is to provide a "last look" memory. Microprocessor 369 responds to a change in status from off-hook detectors, mode buttons, hold buttons, and other system sources of changeable information. A change from off-hook to on-hook status, for example, is perceived by microprocessor 369 as a change in the information corresponding to a specific circuit source contained in RAM 364. The RAM "last look" memory information changes continually; new circuit status data is written into it, read out, and compared with previous data by the microprocessor. RAMs 364 also provide temporary storage for other forms of information required by other microprocessor functions.

Microprocessor 369 also controls all system switching functions. The microprocessor initiates switching functions in response to data information received from switch initiating components such as the station module key switches, the ring detector component associated with each line circuit, or the off-hook detector included in the station circuit—each of which is more fully described in the context of FIGS. 3b-3d discussed below.

The microprocessor updates its functions using well-known time division multiplexing techniques, scans and interrogates all control points, where application compares control point information with that contained in its "last look" memory, and sends connection or disconnection commands in response to changed conditions. The scanning time, or cycle time, is 10 milliseconds.

The ROMs 363 store the system software. This software may be altered by exchanging the ROMs, thereby making it possible to provide customized programs for unusual features at reasonable cost.

Figure 4:
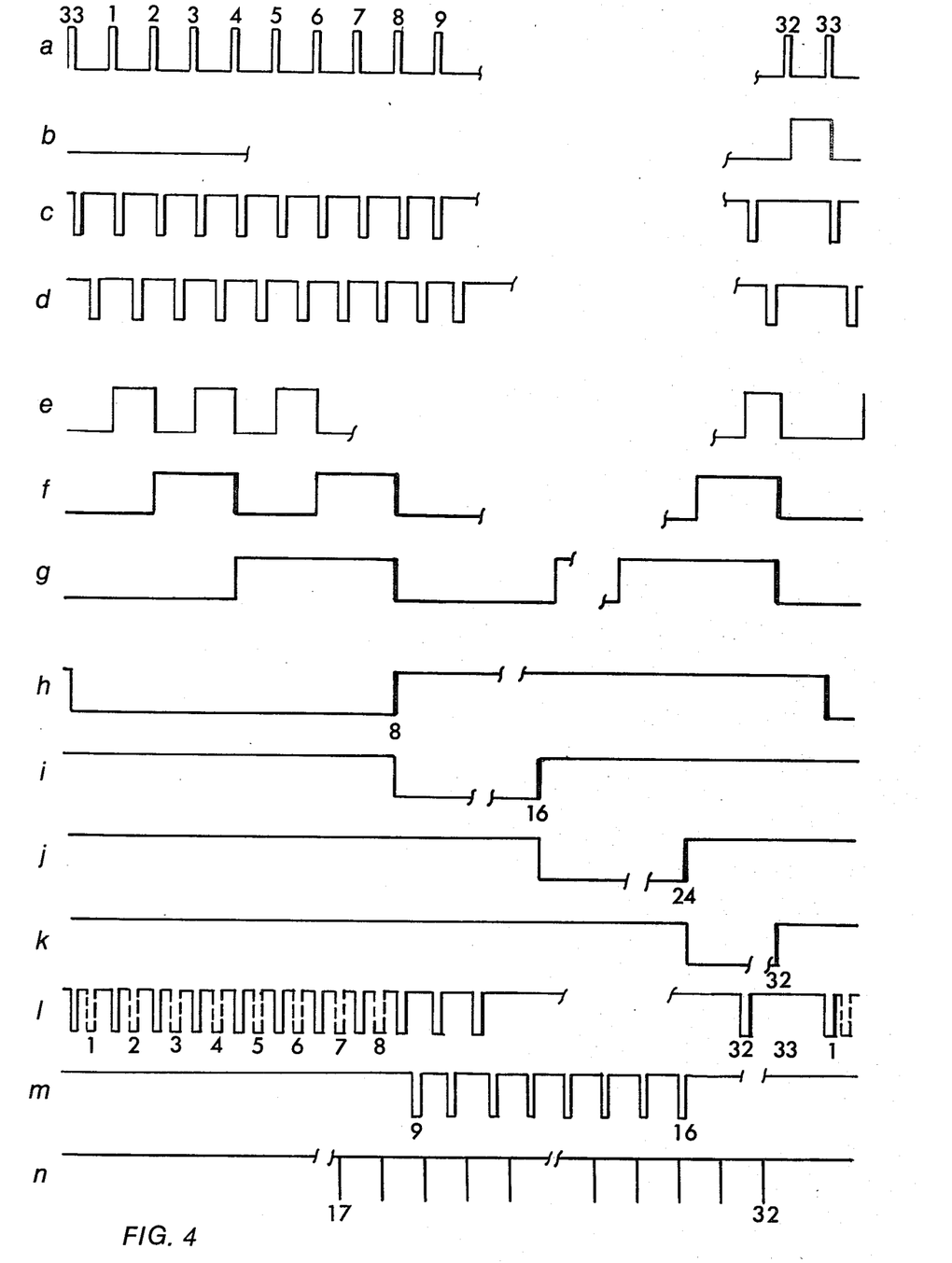

The central processor unit requires three buses for communication between the other major system components contained in the common equipment. These buses include (1) a 14-channel, unidirectional, parallel address bus 135, which enables the latches and switching fields contained on the associated line/intercom circuits and station circuits; (2) an 8-channel bi-directional parallel data bus, indicated schematically by 134, for transmitting data to and from the switching points and latches; and (3) a 9-channel unidirectional control bus, also represented by 135, which transmits a clock pulse stream, timing, and control signals to control the serial bit stream. This latter bus also carries common station data interlaced with clock pulses as described with reference to FIGS. 4a-4n to all common data latches contained on other system circuits, such as data indicative of the lamp indicator states.

Functional Description of C.O./PBX Line/Intercom Circuit

Figure 3B:
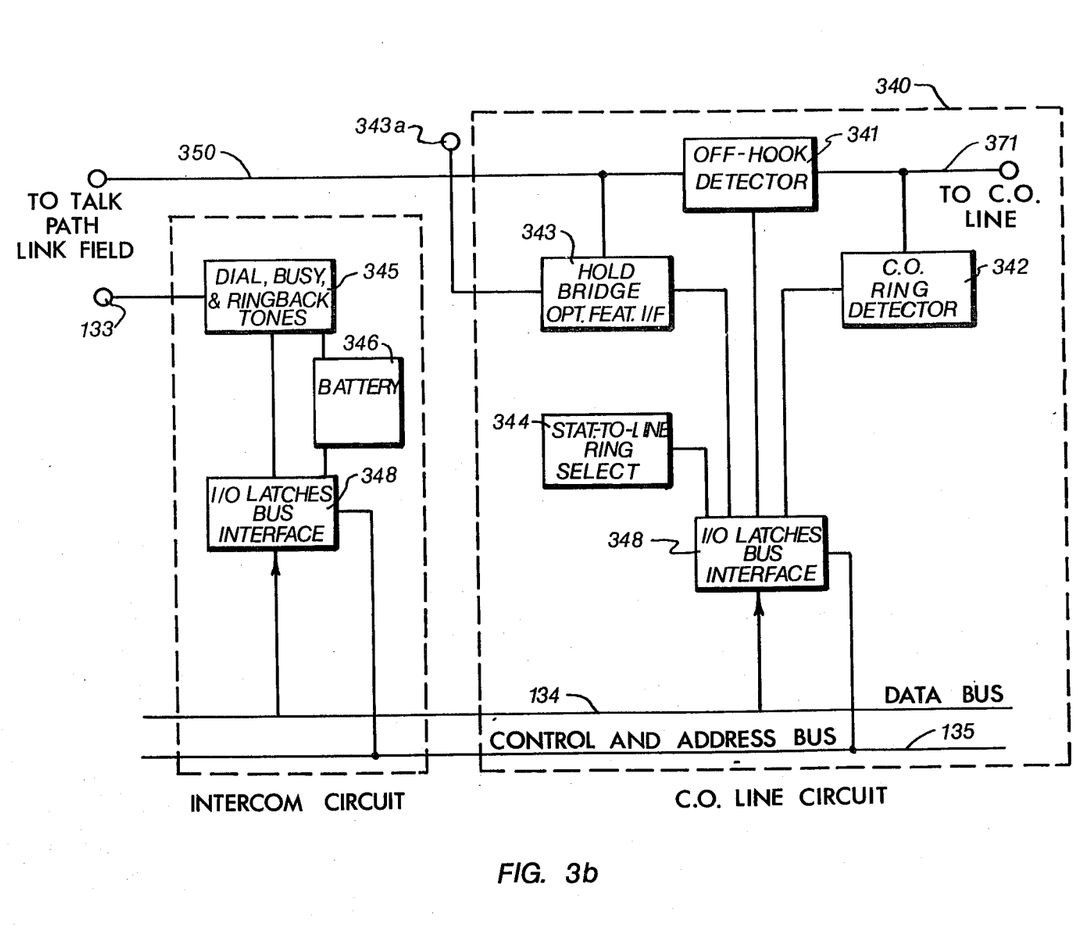
FIG. 3b is a functional block diagram of the line and intercom circuit module.

The line/intercom circuit shown in FIG. 3b is, for purposes of the preferred embodiment of this invention, divided into two parts. To facilitate manufacture, installation, repair, and reasonably anticipated user requirements, each of the line/intercom printed circuit boards contains the electronics for three separate central office or private branch exchange station lines and one intercom circuit. Other combinations may be used, and multiple boards may be employed in a single system to provide varying capacity in different units of modularity.

The C.O./PBX station line circuit portion 340 of the line/intercom printed circuit module contains an off-hook detector 341, a ring detector 342, a hold relay 343 and, if desired, an optional feature interface 343(a), such as for a music-on-hold source, and a ringing option strapping field 344. Each circuit operates in conjunction with only one single central office or PBX line, and is not shared among lines, nor does it have any direct association with any station position. The functions performed by circuits 341 through 344 are well known in this field, and for purposes of this invention, consist of conventional components and circuit designs. Very little further needs to be said about these circuits other than that the one difference in their operation when employed with this invention is that the output signal of each is communicated to the microprocessor 369 for storage in RAM memory 364 via parallel data bus 134. Microprocessor 369 responds to the individual line circuit detector outputs by sending out corresponding commands to the appropriate station circuit module. Hold commands directed to a particular line circuit, initiated from the station module and transmitted to microprocessor 369 via data bus 134 are similarly processed by the microprocessor, and a corresponding control signal transmitted via data bus 134 to holding bridge 343.

C.O. or PBX line 371 is connnected to speech conductor path 111 of FIG. 1 through a relay or solid state cross-point matrix contained on station circuit module 130. The relays or cross-points of this matrix (shown in FIG. 3c) are controlled by the central processor unit. Speech processing, digitization or multiplexing of the voice signals is not required; conventional space division technology is employed by this invention for line connection functions. This is advantageous in that it preserves the continuity of a direct electrical connection to the outside network line facilities, thereby avoiding signalling problems of time division switching.

The intercom circuitry 350 of each line/intercom circuit module contains traditional components needed to implement one intercom link. This includes conventional talk battery 346, and a processed tone generator 345 for supplying distinct dial tone, ring-back tone, and busy tone. The various tone functions are provided at the station circuit by processing the tone signals of tone generator 345. The intercom talk path, like the C.O. line, interfaces directly with the station speech conductor path 111 via the relay or cross-point matrix contained on station control circuit 130, and speech bus 133, all shown in FIG. 1. Status and control signals for the various functional components of both the C.O. line circuit 340 and the intercom circuit 350 are stored by means of I/O latches and bus interface 348, and communicated over the bi-directional data bus 134. Operation of the I/O latches and bus interface is controlled by microprocessor signals communicated over control and address bus 135.

Functional Description of Station Circuit Module

Figure 3C:
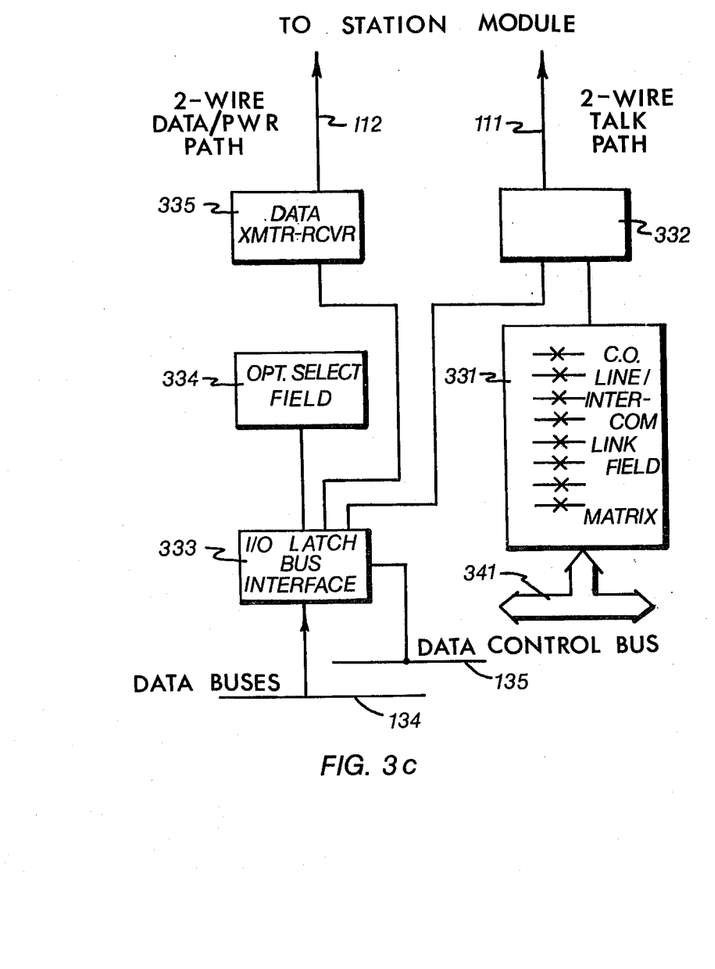
FIG. 3c is a functional block diagram of the station circuit module.

A simplified block diagram of the station circuit module is shown in FIG. 3c. In the preferred embodiment, each printed circuit board supplies the control circuitry for at least two station modules. The talk path switching functions between the telephone set and the line/intercom circuit, and all data communication and latching functions between the microprocessor 369 and the station module 110 (both shown in FIG. 1) are executed at the station circuit module.

An off-hook detector and a supervisory relay, represented by 332, is included on the station circuit for monitoring the speech path status of each telephone 100. The supervisory relay connects a local talk battery and dial tone when an intercom call is placed. As in the case of the line/intercom circuits, the off-hook detector and supervisory relay signals are communicated as data signals to the microprocessor 369 of FIG. 3a over bi-directional parallel data bus 134.

Once the station mode and corresponding service request is conveyed to the microprocessor, the connection process is taken over under the control of the microprocessor, and the supervisory relay 332 is released from circuit control functions. The microprocessor then controls the talk path link field 331, including the relay or cross-point matrix, to set up either the C.O./PBX line or intercom path connection requested.

It should be noted that the microprocessor responds only to TURN ON and TURN OFF information. When a control signal must be held, such as a lamp indicator or LED (Light Emitting Diode) ON/OFF signal, or a talk path relay or cross-point which must be held ON for the duration of a call, a latch is used. The latch, or temporary memory, is either set or reset by the microprocessor via the data bus 134. The signal on the data bus does not have to remain active; the microprocessor is alerted by, and reacts only to change. The latches of the individual station circuit module, like the latches used on other circuits throughout this invention, retain the command until instructed to change by the microprocessor.

Speech signals, dial, busy, and ring-back tones, and talk battery are transmitted to telephone set 100 via station module 110 and the two-conductor talk path 111, shown in FIG. 1. Call waiting tones are generated locally at the station module in response to proprietary station data signals, and are not communicated over the speech path. Only one pair of speech conductors is necessary between the station circuit module and its associated station module, regardless of the number of C.O./PBX lines or intercom paths having an appearance at the station module. It will be appreciated that, for simplicity of manufacture and installation, in the preferred embodiment of this invention all C.O./PBX lines and intercom paths electrically appear at each station control circuit, and therefore may be made to appear at each station module. However, the scope of the invention contemplates that this so-called rectangular array may not be appropriate for all possible applications, and that at medium to large system sizes, not all C.O./PBX lines will necessarily appear at all station modules, or even at all station control circuits.

Functional Description of Station Module

Figure 3D:
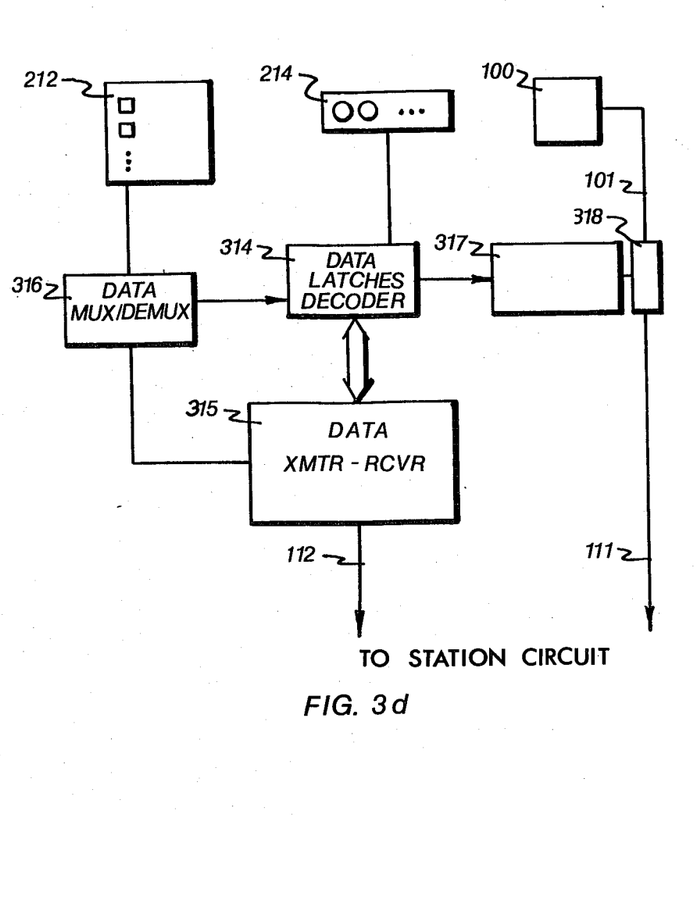
FIG. 3d is a functional block diagram of the station module.

A simplified block diagram of a typical station module 110 is shown in FIG. 3d. Data transceiver 315 terminates the data/power conductor 112, and includes well known pulse transformer and data separator elements for communicating and separating the data signals and power. Power is fed to conventional voltage regulator and power distribution circuits, not shown, but located in the station module. The data transceiver further includes clock/data separator circuit which functions as part of the data separator to extract data information signals from clock pulses and recirculate the serial bit stream for transmission of station module data to the station circuit module. A missing clock pulse detector circuit associated with the clock/data separator functions to detect the start of each new frame and thereby synchronize the station module with the central processor. This novel feature of the serial bit stream technique achieves system synchronization without additional complex clock synchronizing devices at the station module.

Separated data signals indicative of LED status are directed to data latches 314 for control of lamps 214. Separated audible signal control data information is also directed to data latches 314 for control of the ringing oscillator and speaker amplifier included in 317, for audible station signaling, including call-waiting signaling. The buzzer or bell in the conventional telephone instrument 100 is not used for call alerting functions; instead, call alerting signals are communicated over the data path and control the electronic ringing oscillator 317 contained within the station module. Where paging feature service is employed with this invention, voice paging signals originating via the intercom from another station are transmitted over talk path 111, and bridge-connected across the talk path 111 and telephone tip and ring 101 at interface 318 under the control of proprietary data signals communicated over data/-power pair 112, such that the directed voice paging signals are announced at the station location over speaker and amplifier assembly illustrated at 317 contained in the station module. When a party at the paged station takes telephone 100 off-hook, the speaker and amplifier assembly are disconnected and talk pair 111 is connected directly to telephone network via 101.

Data signals indicative of line selection, intercom selection, hold functions, or requests for other special service features are initiated as binary signals which correspond to the depression of non-locking key switches 212. The non-locking switches employed with this invention are of the conventional electronic variety widely used with electronic telephone equipment. The binary signals from the switches are converted to serial form, and interlaced with clock pulses at the appropriate bit location of the serial bit stream by means of multiplex circuitry 316. These signals are transferred as part of the serial bit stream via data transceiver 315 to the data receiver element in data transceiver 335 at station circuit module 130, shown in FIG. 3c. The station circuit data receiver includes data separator associated with input latch 333 for separating the key switch data signals from the serial bit stream and storing the same for communication to and upon interrogation by the central processor over bi-directional data bus 134.

BRIEF DESCRIPTION OF SERIAL BIT STREAM OPERATION

The principal feature of this invention is the utilization of a serial bit stream for the transmission of command, status and control data signals between the station circuit module located in the common equipment, and the station modules situated at the user position. In some key system installations, this distance may be very long—from 200 to even 2,000 feet. In addition, key telephone systems are often used in harsh commercial or industrial environments where they may be exposed to extraneous signals or electromagnetic interference from many sources. In these environments, the transmission of control data signals over long loop distances becomes very susceptible to data error. The use of the novel serial bit stream of this invention represents a substantial improvement over other electronic key telephone systems, and serves to overcome the problems of operating in extreme environments, while minimizing the number of components required to assure error-free data transmission.

Data control information is communicated between the central processing unit 160 and the station circuit 130, shown in FIG. 1, via parallel data bus 134. Specifically addressed proprietary station data signals destined to each station circuit are read from parallel data bus 134 by bus interface and output latch 333. Parallel-to-serial converter circuitry of the station circuit converts this information from parallel mode to serial mode to be multiplexed onto the serial bit stream for communication to the station module over the two-conductor data/power path 112. The data transceiver, including pulse transformers associated with termination of the data/power conductor pair communicates the serial bit stream bi-directionally between the station circuit and the station module continuously, under the timed control of the central processor clock and timing circuitry 366 shown in FIG. 3a. The station circuit includes separate addressable latches for both proprietary data to and key switch-initiated data received from the associated station module. The use of separate latches for information destined to and received from the station modules makes it possible to operate the serial bit stream in an asynchronous mode with respect to the microprocessor 369 and its associated parallel data bus 134.

Common control data, such as LED lamp data which is required in common by all station modules, is stored in central processor RAM memory 364, until a change in the data is detected by associated logic circuitry. Common station data signals are then mutliplexed onto the clock pulse stream for communication to the station circuit over the unidirectional serial channels of control and address bus 135.

The serial bit stream technique employed in this invention represents an improved adaptation of data control and communication techniques only recently developed in the computer field. For a description of variations of the serial bit stream scheme as applied outside the telephone equipment field, refer to the articles entitled (1) "LSI Controller Makes It Easier to Tie a Floppy Drive to a Computer," *Electronic Design*, Vol. 19, Sept. 13, 1978, pp. 90-96; and (2) "Noise Tolerant Computer Link", NASA TechBriefs, Summer 1978, p. 178.

Data transceiver 335 of FIG. 3c includes both data power transmitter and data receiver elements. Power from the remote power supply 180 shown in FIG. 1 is phantomly coupled via a pulse data transformer so as to transmit low voltage DC power via the data/power conductor path 112 to power the electronics of the station module 110. In accordance with one of the features of this invention, the relative uniform size and frequency of the clock and data pulses of the serial bit stream facilitates the use of a small and cost effective data/power pulse transformer.

Detailed Description of Serial Bit Stream

The novel scheme and circuitry employed in this invention permits bi-directional, asynchronous transfer of an uninterrupted serial bit stream over a single data conductor path linking the station module with its corresponding station circuit. The characteristics of the serial bit stream may be more fully understood with reference to FIGS. 4a to 4n. FIGS. 4a-n illustrate several characteristics of the serial bit stream, including the format adopted for use with the preferred embodiment of this invention. However, other variations of this format, such as larger frame sizes and bits of longer duration, could obviously be employed to accommodate system variations from the illustrated configuration.

The data stream is characterized by a serial stream of multi-phase bits, each bit position of which is divided into two subperiods—a clock subperiod, and a data subperiod. The leading clock pulse is for bit synchronization, and signals the start of a bit period. System clock 365 of timing control circuit 366, shown in FIG. 3a, includes a 2 MHz crystal-controlled signal which is divided to produce a five-phase 20 kHz serial stream of clock pulse, as shown in FIG. 4a, each spaced approximately 50 microseconds apart. The 20 kHz frequency is selected as a signal level reasonably out of the range of the ordinary voice band, thereby avoiding undesirable coupling, or cross-talk from the data conductor path 112 to the talk path 111.

The timing control circuitry of the central processor unit further includes logic circuitry for generating a timing pulse having a predetermined relationship to the passage of a number of clock pulses. This signal will be used to generate a bit of missing pulses determinative of the desired frame length. As shown in FIG. 4b, in the preferred embodiment this timing pulse appears coincident with the 33rd clock pulse position. However, as may be appreciated, the timing/clock pulse could be selected at any desirable interval to generate frame lengths of more or less than 32 bits.

The bit positions become defined by the signal generated and shown in FIG. 4c. FIG. 4c illustrates the serial clock stream of FIG. 4a, modified by the imposition of the missing clock pulse generated signal, FIG. 4b. This modified serial clock stream is characterized by a missing clock pulse at every 33rd clock pulse position. The modified serial clock stream shown in FIG. 4c is trailing-edge synchronized with the basic 20 kHz clock stream signifying the definition of multi-phase bit positions, each phase of which is about 10 microseconds in duration.

FIG. 4d illustrates a data enable control signal generated at the central processor for defining precisely the phase position within each bit at which data pulses will be interlaced. FIGS. 4e, 4f, and 4g illustrate the output of a hex counter contained within the central processor unit for generating control signals which control the proper positioning of data information signals as the emerge from the parallel to serial convertor to be multiplexed onto the serial bit stream at predetermined bit positions. FIGS. 4h, 4i, 4j and 4k illustrate the output signals of a logic two to four decoder within the central processor for generating control signal information determination of the data word length and positions within each frame of the serial bit stream. For purposes of the preferred embodiment of this invention, the serial bit stream is separated into standard 32-bit frames, consisting of four 8-bit bytes, or data words. The 32-bit frames are separated by at least one 50 microsecond skip, or one empty bit, characterized by the absence of both clock pulse and data pulse information. The omission of clock and data pulses in this 33rd bit position signifies the start of a new frame, and otherwise serves as a frame sync. This serial bit stream format is illustrated in FIG. 4l.

FIG. 4l illustrates common station lamp data superimposed within the first word position (i.e., first 8-bit position) of the modified serial clock stream of FIG. 4c. This signal is communicated to the input of the station circuit multiplexer via the unidirectional serial channel of control and address bus 135.

One of the features of the invention is that data, such as LED control data, common to a group of stations, may be generated at the central processor and transmitted to all stations simultaneously during each cycle. This is in contrast to the operation of other electronic time division multiplex control signalling electronic key systems wherein the transfer of such common information occurs in sequential fashion requiring that the central processor poll each station for the communication of both common and proprietary data information. The clock/data stream of FIG. 4l is replicated continuously every 1.65 milliseconds, or, in other words, every 33 or other frame determinative clock periods.

At the station circuit module, proprietary data (i.e., data unique to the associated station module) is interlaced with clock pulses in yet other bit positions by multiplexing with the clock/data signals of the serial bit stream shown in FIG. 4l, resulting in a reconstituted serial bit stream containing both common and proprietary station module data.

FIG. 4m defines the second word position within the frame, and controls the positions at which the proprietary station data signals are interlaced onto the serial bit stream. The proprietary station data signals are communicated to the station circuit module by a bi-directional parallel data bus 134 shown in FIG. 1, which links the central processor, other functional circuit elements including line and intercom circuit modules, and the station circuit module. The proprietary data is converted from parallel to serial form by conventional logic circuitry in preparation for multiplexing onto the clock/data serial bit stream. As noted above, the precise bit and word location to be occupied by the proprietary data information is controlled by a phase-synchronized signal, 4m, for enabling the transfer of parallel- to serial-converted data during a predetermined word position within each frame. This signal, like that of 4l, communicates between the central processor and the station circuit over a separate unidirectional serial channel included in control and address bus 135. At this point, the serial bit stream is characterized by clock pulse and data information in the first 16 bit positions of each frame, and a clock pulse and zero data information in the second 16 bits of each frame for transfer to the station module.

At the station module, data signals from the first 16 bit positions are separated by de-multiplexing from the serial bit stream, and the data information is directed by logic control circuitry to its respective memory registers or latches for corresponding station audible signalling control and lamp operation. The original data information in the first frame interval continues to be recirculated to and from the station circuit module until the information in any bit position requires updating. Updating of the data information occurs only when there exists a change in the information state at the respective data source.

Data information indicative of key switch operation, or any sequence of key switch operation corresponding to a predetermined function, such as a special service function, is generated by and multiplexed onto bit positions of the second frame interval of the serial bit stream at the station. The actuation of any key switch results in a corresponding binary unipolar data signal. This data information is not stored in local station module latches, but is directed to the data transceiver circuitry for immediate transfer onto the circulating serial bit stream. Logic control means consisting of a conventional "ripple" or bit counter is employed to position the multiplexing of the key switch data signals onto the serial bit stream precisely at the predetermined word and bit position.

The serial bit stream with the key switch signal information added is communicated via the data transceiver circuitry of the station module to the data receiver circuitry of the station circuit module. A data separator, or de-multiplexer, at the station circuit module reads the station initiated key switch data from the serial bit stream and directs it to be stored in the associated station circuit input latch for interrogation by the central processor unit. Data separation of the correct bit information (i.e., from those bit positions appearing in the second frame interval) is controlled by the read signal, FIG. 4n, communicated from the central processor via the serial channel of bus 135.

The data information last entered in the bit positions of both the first and second frame intervals continue to be refreshed and recirculated via the hybrid data transceiver circuits of both the station circuit module and a station module, until a change in either common, proprietary, or key switch data occurs. At such time, the original information is updated to reflect the changed status.

As noted above, among the other particular advantages offered by the use of the novel serial clock/data bit stream of this invention is that it facilitates the use of clock and data pulses of relatively uniform size. This, in turn, minimizes the size and thus cost of the data pulse transformer required at both the station module and the station control circuit ends of the data/power conductor path necessary for coupling the data signals with the power signals. However, notwithstanding the general objective of relative clock and data pulse uniformity, it is desirable that the data pulses included in the bit positions reserved for data transmission from the station module to the station control circuit be slightly longer in duration than the width of the data pulses transferred to the station module in the first 16 bit positions. This is to compensate for possible propagation losses likely to be encountered as a result of having to travel the station data conductor loop in both directions. For purposes of the illustrated embodiment, a 15 microsecond pulse width has been used, assuming a propagation rate of 1 ns per cable foot, for a distance of up to 4,000 feet.

This invention may be embodied in other specific forms without departing from its spirit or essential characteristics. The described embodiment is to be considered in all respects only as illustrative and not restrictive, and the scope of the invention is, therefore, indicated by the appended claims, rather than by the foregoing description. All changes which come within the meaning of range of equivalency of the claim are to be embraced within their scope.

What is claimed is:

1. In an electronic key telephone system using time-division multiplexing for the communication of command, status and supervisory signals among functional circuit elements, and including a group of stations each equipped with audible signaling means and nonlocking key switches with associated lamp indicators, each station having access to a plurality of communication lines by means of an individual speech conductor pair, a central processor module for controlling the connection and intercommunication of signals between said lines and stations, and by an individual data conductor pair associated with each of said stations for the bi-directional communication of data control signals, the improvement comprising:

central processor electronic timing means, including a system clock for generating a clock pulse stream;

central processor logic means for generating unipolar digital data signals common to each station;

central processor multiplex means for interlacing said common data signals with clock pulses of said clock pulse stream to form a serial bit stream, each bit position of which begins with a clock pulse and includes either zero or a one data information;

said timing means including bit counting means for dividing said serial bit stream into repetitive frames of a predetermined number of bit positions;

a station circuit module associated with each station and connected thereto by a separate speech conductor pair and data conductor pair;

a line circuit module associated with each communication line;

plural bus means for intermodule communication of clock pulse and data signal information;

said station circuit module including latch means for storing unipolar digital data signals proprietary to the associated station;

said station circuit module further including multiplex means associated with said latch means for interlacing said proprietary data signals with clock pulses at predetermined bit positions of said serial bit stream for communication to the associated station;

separate data interface means connected to each end of said data conductor path for the bi-directional transfer of said serial bit stream between said station circuit module and the associated station;

first data separator means associated with the station data interface means for separating data signals from the clock pulses of selected positions of said serial bit stream;

station latch means for storing said separated data signals, and associated decoding means operative on said stored data signals for controlling said lamp indicators and audible signalling means station multiplex means associated with the station interface means and connected to the output of said nonlocking key switches for interlacing unipolar digital key switch data signals with clock pulses at predetermined bit positions of said serial bit stream for communication to said station circuit module;

station circuit data separator means associated with said station circuit data interface means for separating said key switch data signals from the clock pulses of said serial bit stream; and station circuit output latch means associated with said station circuit data separator means for storing key switch data signals for communication to said central processor.

2. An electronic key telephone system using time-division multiplex control signalling, including a plurality of communication lines with associated line circuits; at least one intercom link; a plurality of telephone stations with associated nonlocking key switches, lamp indicators, and audible signalling means; a programmable central processor control unit; connecting means for connecting at least one of said lines to said stations; an individual station circuit for each station; at least one data conductor pair extending between each station and its station circuit; and speech conductor pair at each station, the improvement wherein:

said central processor includes:

a system clock which generates a stream of clock pulses, means operative on said stream of clock pulses for defining a serial bit stream of multi-phase bits in which each bit position is divided into a clock subperiod and a data subperiod and said clock subperiod contains a clock pulse for signalling the start of the bit period, timing means for controlling said serial bit stream including counting means for separating the bits of said serial bit stream into repetitive frames of a predetermined number of bits, each frame separated by a string of one or more bit positions devoid of both clock pulse and data information, plural bus means for communicating said serial bit stream and address, data, and control signal information between said central processor and said line circuits, intercom link, and station circuits, and processor multiplex means for interlacing unipolar digital common station data signals with said clock pulses in predetermined bit positions of said serial bit stream;

each of said station circuits include:

addressable output latch means associated with a first of said bus means for storing unipolar digital proprietary station data signals, station circuit multiplex means associated with said output latch means for interlacing said proprietary station data signals with said clock pulses in predetermined bit positions of said serial bit stream, and station circuit interface means associated with said station circuit multiplex means including data transceiver means connected to said data conductor pair for the continuous bi-directional communication of said serial bit stream with the associated station; and each of said telephone stations includes:

station interface means including data transceiver means connected to said data conductor pair for the bi-directional communication of said serial bit stream with the associated station circuit, station data separator means associated with said station interface means for separating said data signals and clock pulses from the serial bit stream communicated from said station circuit interface means including missing clock pulse detector means for synchronizing said serial bit stream, station latch means for selectively storing separated common and proprietary data signals, decoding means connected to said station latch means for converting said separated data signals to corresponding lamp indicator and audible control signals, and station multiplex means associated with said station interface means and connected to the output of said nonlocking key switches for interlacing key switch data signals with said clock pulses in predetermined bit positions of said serial bit stream for communication to said station circuit.

3. An electronic key telephone system as claimed in claim 2, further including:

a power source coupled to each of said station circuit means for supplying D.C. power separately to said stations over the respective data conductor pair;

power separator means associated with said station data transceiver means for separating said power signals from said serial bit stream signals.

4. An electronic key telephone system as claimed in claim 2, further including:

station circuit data separator means associated with said station circuit interface means for separating said key switch data signals from said clock pulses of said serial bit stream, and addressable input latch means associated with a second of said bus means for storing said separated key switch data signals for interrogation by said central processor.

5. An electronic key telephone system as claimed in claim 4, further including:

line status detector means associated with each of said line circuits, the output of which is connected to a third one of said bus means, processor-controlled address decoder means for sequentially interrogating said station circuit latch means and line status detector means, temporary memory means associated with said address decoder means for storing information data signals from the output of said line status detector means and from said station circuit latch means, first logic means for comparing the contents of said temporary memory means with its previous contents, second logic means associated with said first logic means for registering a change in the contents of said temporary memory with its previous contents, and central processor means responsive to a change registered by said second logic means for initiating a predetermined line connection or station control data signal.

6. An electronic key telephone system as claimed in claim 4, wherein:

said telephone station includes a separate station module and a conventional single line telephone instrument the tip and ring leads of which are connected to said station module;

said station module includes said station interface means, data separator means, latch means, decoding means, multiplex means, nonlocking key switches, lamp indicators, and audible signalling means; and the station termination of said speech conductor pair interfaces with the tip and ring of said telephone instrument at said station module.

7. An electronic key telephone system as claimed in claim 6, wherein:

said central processor includes programmable control logic means responsive to a predetermined sequence of key switch data signals appearing in said station circuit input latch means, and at least one central processor-controlled service module associated with said station circuits for providing a corresponding service feature in response to said control logic means.

8. An electronic key telephone system as claimed in claim 7, wherein:

said service module includes station dial intercom means; and said control logic means is programmed to control said dial intercom means and to initiate called station address and intercom signalling information for communication to said called station as proprietary data signals in predetermined bit positions of said serial bit stream.

9. An electronic key telephone system as claimed in claim 7, wherein:

said service module includes station paging means, and, said control logic means is programmed to control said station paging means and to initiate called station address and paging signalling information for communication to said called station as proprietary data signals in predetermined bit positions of said serial bit stream.

10. An electronic key telephone system as claimed in claim 9, wherein:

said speech conductor pair is connected to the tip and ring of said instrument by bridge connecting means;

said station module further includes a speaker and amplifier assembly connectible to said speech conductor pair by said bridging means; and said station module bridging means is operatively responsive to said called station address and paging signalling information.

11. An electronic key telephone system as claimed in claim 4, wherein each of said station circuits includes off-hook detection means associated with said speech conductor pair, and means for converting a detected off-hook signal to a digital data signal for communication to said central processor.

12. In a programmable microprocessor controlled electronic key telephone system using time division multiplex control data signal techniques and whereby control data signals are transferred between the key system common control unit and the associated electronic stations over a data conductor path, the improved method of communicating said control data signals comprising the steps of:

generating a stream of clock pulses and separating said stream into repetitive frames; Generating a source of unipolar digital common station data signals;

generating a source of unipolar digital proprietary station signals;

bussing said common station data signals and said stream of clock pulses to a first multiplexing means;

interlacing by multiplexing said common station data signals with the clock pulses of said clock pulse stream to form a serial multi-phase bit stream, each bit position of which begins with a clock pulse and includes either binary 0 or 1 digital data information;

busing said proprietary station data signals and said serial multi-phase bit stream to a second multiplexing means;

interlacing by multiplexing said proprietary station data signals with the clock pulses of said serial multi-phase bit stream;

bi-directionally communicating said serial multi-phase bit stream to each station over the respective station data conductor pair;

selectively demultiplexing the common and proprietary station data signal information from the clock pulses of the serial multi-phase bit stream at the station;

storing the separated data signals, and decoding the stored information for control of station functions; and initiating station key switch unipolar digital data signals by operation of nonlocking multifunction keys;

interfacing by multiplexing key switch data signal information with said clock pulses onto the serial multi-phase bit stream at predetermined bit positions at the station for communication to the common control unit.

13. The improved method of data signal communication as claimed in claim 12, wherein said repetitive frames are separated by at least one bit position devoid of both clock and data information, and each of said frames is separated into a first and second interval, said common and proprietary station data being assigned to bit positions within the first frame interval and key switch data signals being assigned to bit positions within the second frame interval.

14. The improved method of data signal communication as described in claim 12, wherein said sources of common and proprietary station data signals, and said key switch data signals are polled under the control of the central processor unit for changes in said data signal information.

* * * * *